(12) United States Patent
Chirania (10) Patent No.: US 7,552,410 B1
(45) Date of Patent: Jun. 23, 2009

(54) ESTIMATING LUT POWER USAGE

(75) Inventor: Manoj Chirania, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 86 days.

(21) Appl. No.: 11/650,153

(22) Filed: Jan. 5, 2007

(51) Int. Cl.
*G06F 17/50* (2006.01)

(52) U.S. Cl. .................................. 716/5; 716/4; 326/41

(58) Field of Classification Search ...................... 716/4, 716/16; 326/37–41
See application file for complete search history.

(56) References Cited

U.S. PATENT DOCUMENTS

| | | | | |
|---|---|---|---|---|
| 6,212,665 | B1 * | 4/2001 | Zarkesh et al. | 716/4 |
| 6,345,379 | B1 * | 2/2002 | Khouja et al. | 716/4 |
| 6,480,815 | B1 * | 11/2002 | Olson et al. | 703/14 |
| 6,493,659 | B1 * | 12/2002 | Takita | 703/14 |
| 7,107,566 | B1 * | 9/2006 | McElheny | 716/16 |
| 7,188,266 | B1 * | 3/2007 | Mendel et al. | 713/320 |
| 7,348,827 | B2 * | 3/2008 | Rahim et al. | 327/534 |
| 7,363,208 | B2 * | 4/2008 | Cao | 703/18 |
| 7,370,299 | B2 * | 5/2008 | Huang et al. | 716/4 |

OTHER PUBLICATIONS

"Switching Activity Analysis using Boolean Approximation Method", Taku Uchino, Aug. 2002, IEEE p. 20-23.*
Najm, Farid N., "Transition Density: A New Measure of Activity in Digital Circuits", IEEE Transactions On Computer-aided Design Of Integrated Circuits And Systems. vol. 12, No. 2., Feb. 1993, pp. 310-323, available from IEEE, 3 Park Avenue, 17th Floor, New York, NY 10016-5997.

* cited by examiner

*Primary Examiner*—Rexford Barnie
*Assistant Examiner*—Christopher Lo
(74) *Attorney, Agent, or Firm*—Kevin T. Cuenot (57) ABSTRACT

A method of calculating power usage of a lookup table (LUT) implemented on a programmable logic device can include determining input power usage of the LUT and determining output power usage of the LUT. The method further can include determining internal power usage of the LUT. Data rates, LUT configuration, and node capacitance information can be used in determining input, output, and internal power. A measure of power usage for the entire LUT can be provided by summing the input power usage, the output power usage, and the internal power usage.

17 Claims, 4 Drawing Sheets

ESTIMATING LUT POWER USAGE

BACKGROUND OF THE INVENTION

Software-based logic simulation and/or design tools, also referred to as electronic design automation (EDA) tools or computer aided design (CAD) tools, are capable of performing various circuit design tasks. Circuit designs can be specified in a programmatic form, i.e., using a hardware description language such as VHDL or Verilog. Hardware description languages permit hardware designers to define signals at a very high level of abstraction which can be translated, by the design tool, into actual pins and circuitry for a target device such as a programmable logic device (PLD). The design tool further can perform an analysis of the circuit design with respect to timing, functionality, and power consumption, and provide such information back to the circuit designer.

In terms of power consumption, the design tool typically relies upon a model for each of the various components specified by the circuit design. Each model provides a procedure, or technique, for calculating an estimate of the power that likely will be dissipated by the corresponding physical circuit element when implemented on a target device. Evaluation of the models for the circuit elements in a circuit design can provide the designer with an estimate of the power consumption for the entire circuit design or target device.

Most power estimation techniques rely upon one or more assumptions regarding the circuit element being represented. These assumptions effectively are constants that do not account for the actual configuration of the circuit element as used within a particular circuit design, or the usage of the circuit element within that circuit design. In consequence, the accuracy of a power estimate for a single circuit element can range from being somewhat accurate to very inaccurate.

In view of the significant number of components in a circuit design, even small differences between estimated power consumption and actual power consumption for a single component, when compounded over the entire circuit design, can lead to significant errors in estimating overall power consumption. Thus, accurate power estimation at the component level is important not only with respect to evaluating performance of individual circuit elements, but also for evaluating power consumption of the circuit design as a whole.

BRIEF SUMMARY OF THE INVENTION

The present invention is directed to calculating a measure or estimate of power usage for a lookup table (LUT) circuit element that can be implemented within an integrated circuit such as a programmable logic device (PLD). One embodiment of the present invention can include a method of calculating power usage of a LUT implemented on a PLD. The method can include determining input power usage of the LUT, determining output power usage of the LUT, and determining internal power usage of the LUT. A measure of power usage for the entire LUT can be provided by summing the input power usage, the output power usage, and the internal power usage.

The input power usage can be determined by identifying a capacitance for each input node of the LUT. A data rate for each input node of the LUT also can be identified. The data rate for each respective input node of the LUT can be determined from simulation data generated by a gate level simulation of a user-specified circuit design incorporating the LUT in a selected configuration. Power usage for each individual input node of the LUT can be calculated as a function of the data rate and the capacitance for each respective input node. The input power usage can be determined by summing the power usage of each input node.

The output power usage for the LUT can be determined by identifying a capacitance and a data rate of an output node of the LUT. The data rate of the output node of the LUT can be determined from simulation data generated from a gate level simulation of a user-specified circuit design incorporating the LUT in a selected configuration. The output power usage can be calculated as a function of the capacitance and data rate of the output node of the LUT.

The internal power usage of the LUT can be determined by calculating the power usage of each internal stage of the LUT and summing the power usage for each internal stage. The power usage of each internal stage of the LUT can be calculated by identifying a capacitance for each internal stage of the LUT and determining a data rate for each internal node of each internal stage of the LUT. The power consumption for each internal stage can be calculated as a function of the capacitance of each respective internal stage and the data rate of each internal node for each respective internal stage of the LUT.

Another embodiment of the present invention can include a method of estimating power usage of an LUT implemented on a PLD including segmenting the LUT into an input component, an internal component, and an output component. Separate measures of power usage for each component can be determined. The measures of power can be functions of data rate and capacitance for each respective component of the LUT. The measures of power for the input component, the output component, and the internal component can be summed to determine a measure of power usage for the entire LUT.

Determining separate measures of power usage for each component can include, for the input component, segmenting the input component into a plurality of input nodes and determining a measure of power usage for each input node as a function of capacitance and data rate for each respective input node. The data rate of each input node can be determined from gate level simulation data of a user-specified circuit design in which the LUT is disposed. The measures of power usage for each input node can be summed to determine the measure of power usage for the input component of the LUT.

Determining separate measures of power usage for each component also can include, for the internal component, segmenting the internal component into a plurality of stages and determining a measure of power usage for each stage as a function of capacitance for each respective stage and data rates for internal nodes of each respective stage. The measures of power usage for each stage can be summed to determine the measure of power usage for the internal component of the LUT.

Determining separate measures of power usage for each component further can include, for the output component, determining a measure of power usage for the output node of the LUT as a function of capacitance and data rate of the output node of the LUT. The data rate of the output node can be determined from a gate level simulation of a user-specified circuit design in which the LUT is disposed.

Yet another embodiment of the present invention can include a machine readable storage, having stored thereon a computer program having a plurality of code sections for causing a machine to perform the various steps and functions described herein.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein are directed to estimating the power consumption or usage of circuit elements found in a programmable logic device (PLD). More particularly, an accurate estimation of dynamic power consumption for a circuit element, such as a lookup table (LUT) as may be used in a field programmable gate array (FPGA) type of PLD, can be performed. In doing so, a LUT circuit element can be subdivided into a plurality of components or portions. The power usage of each component can be determined individually and summed to determine the power consumption of the entire LUT circuit element. The analysis of each component of the LUT can be performed with reference to the actual configuration of the LUT within a given circuit design as well as data rates of selected nodes of the LUT as determined from simulation data of a user-specified circuit design.

A LUT refers to a programmable element commonly found in FPGA logic blocks. A LUT is a memory array (e.g., a 16×1 array) addressable by a number of input signals (e.g., four input signals). By programming predetermined values into the memory array, the LUT can implement any function of the input variables. While 4-input LUTs are common, LUTs having more or fewer input signals can also be implemented that will accommodate larger or smaller logic functions. Irrespective of the number of inputs, LUTs may also have an arbitrary number of outputs.

Figure 1:
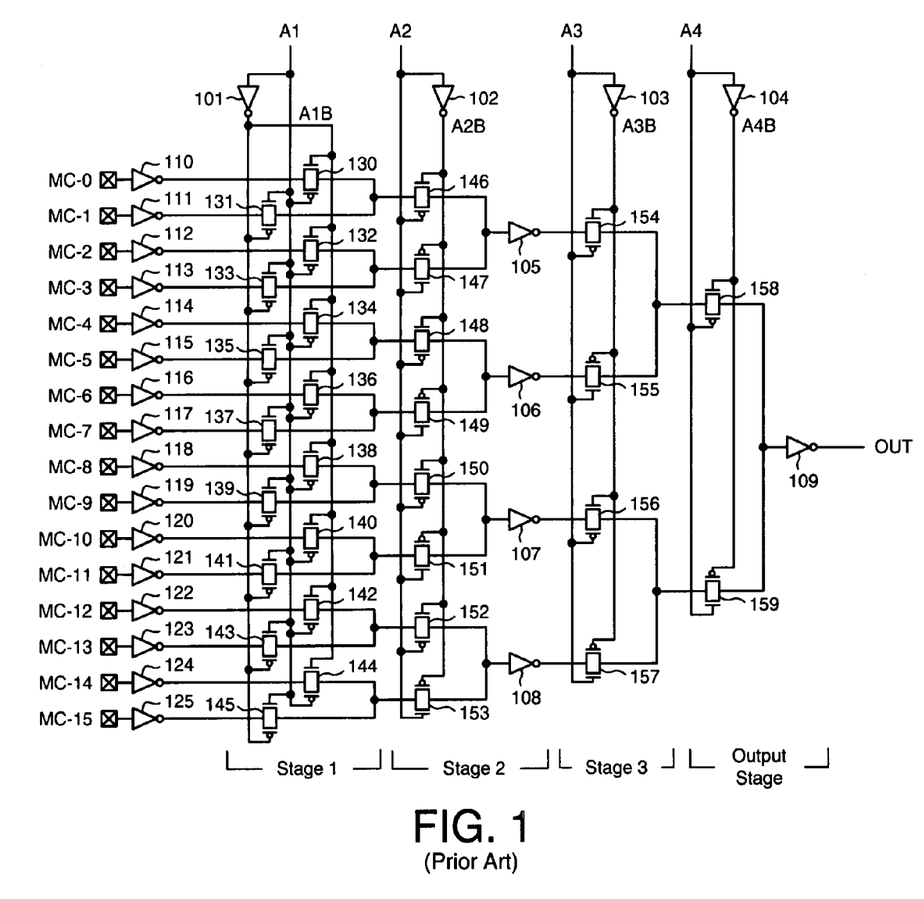
FIG. 1 illustrates a first known lookup table (LUT) circuit that can be included in the programmable logic portion of a programmable logic device (PLD).

FIG. 1 illustrates, in simplified form, a well known 4-input lookup table (LUT) for a PLD. The lookup table is implemented as a four-stage 16-to-1 multiplexer. The four input signals A1, A2, A3, and A4, taken together, select one of 16 values stored in memory cells MC-0 through MC-15. Thus, the LUT can implement any function of up to four input signals. The LUT can be viewed as having three internal stages referenced as stage 1, stage 2, and stage 3, which generally correspond to the input signals A1-A3.

The four input signals A1-A4 are independent signals, each driving one stage of the multiplexer. Inverted versions A1B-A4B of signals A1-A4 are generated by inverters 101-104, respectively. Sixteen configuration memory cells MC-0 through MC-15 drive sixteen corresponding inverters 110-125, each of which drives a corresponding CMOS pass gate 130-145. In stage 1 of the multiplexer, for example, paired pass gates 130-131 form a 2-to-1 multiplexer controlled by signals A1 and A1B, which multiplexer drives a CMOS pass gate 146. Pass gates 132-145 are also paired in a similar fashion to form similar 2-to-1 multiplexers driving associated pass gates 147-153. In stage 2 of the multiplexer, for example, paired pass gates 146-147 form a 2-to-1 multiplexer controlled by signals A2 and A2B, which multiplexer drives an inverter 105. Similarly, pass gates 148-153 are paired to form similar 2-to-1 multiplexers driving associated inverters 106-108.

In stage 3 of the multiplexer, driven by inverters 105-108, pass gates 154-155 are paired to form a 2-to-1 multiplexer controlled by signals A3 and A3B and driving a CMOS pass gate 158. Similarly, pass gates 156-157 are paired to form a similar 2-to-1 multiplexer driving a CMOS pass gate 159. In the output stage of the multiplexer, pass gates 158-159 are paired to form a 2-to-1 multiplexer controlled by signals A4 and A4B and driving an inverter 109. Inverter 109 provides the LUT output signal OUT.

In general, the capacitance of a particular input node, e.g., the input node receiving input signal A1, can be calculated or represented as the capacitance of the wire leading to inverter 101 and the capacitance of the output wires extending from inverter 101 as well as the input gate capacitance of inverter 101. The capacitance of the input nodes corresponding to input signals A2, A3, and A4 can be calculated in similar fashion. The capacitance of the output node providing the signal OUT can be viewed as the capacitance looking into the output of inverter 109.

Figure 2:
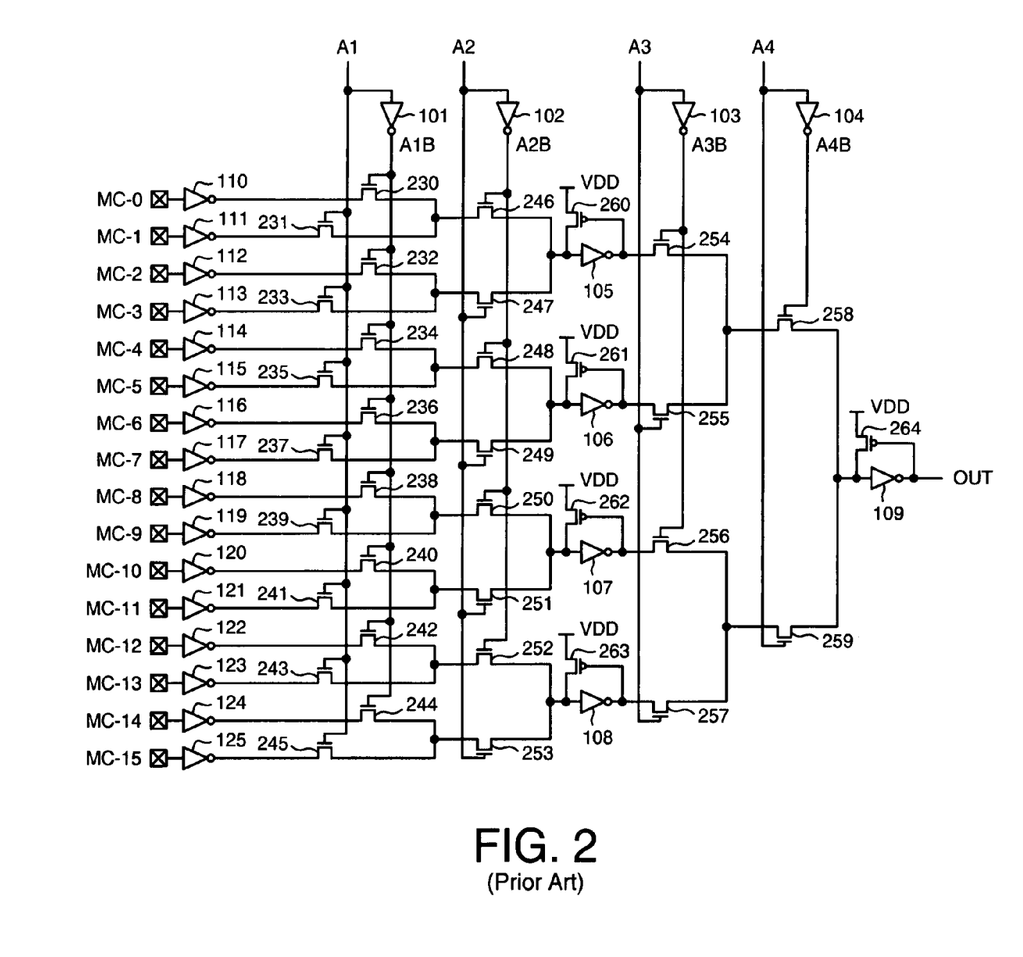
FIG. 2 illustrates a second known LUT circuit that can be included in the programmable logic portion of a PLD.

FIG. 2 illustrates another known 4-input LUT. The LUT of FIG. 2 is similar to that of FIG. 1, except that N-channel transistors 230-259 are substituted for CMOS pass gates 130-159. Because an N-channel transistor imposes a voltage drop on power high signals traversing the transistor, the node driving each inverter 105-109 is also enhanced by the addition of a pullup (e.g., a P-channel transistor) 260-264 to power high VDD. Each pullup 260-264 is gated by the output of the corresponding inverter 105-109. The pullup ensures that a high value on the node driving the inverter is pulled all the way to the power high value once a low value appears on the inverter output node.

Figure 3:
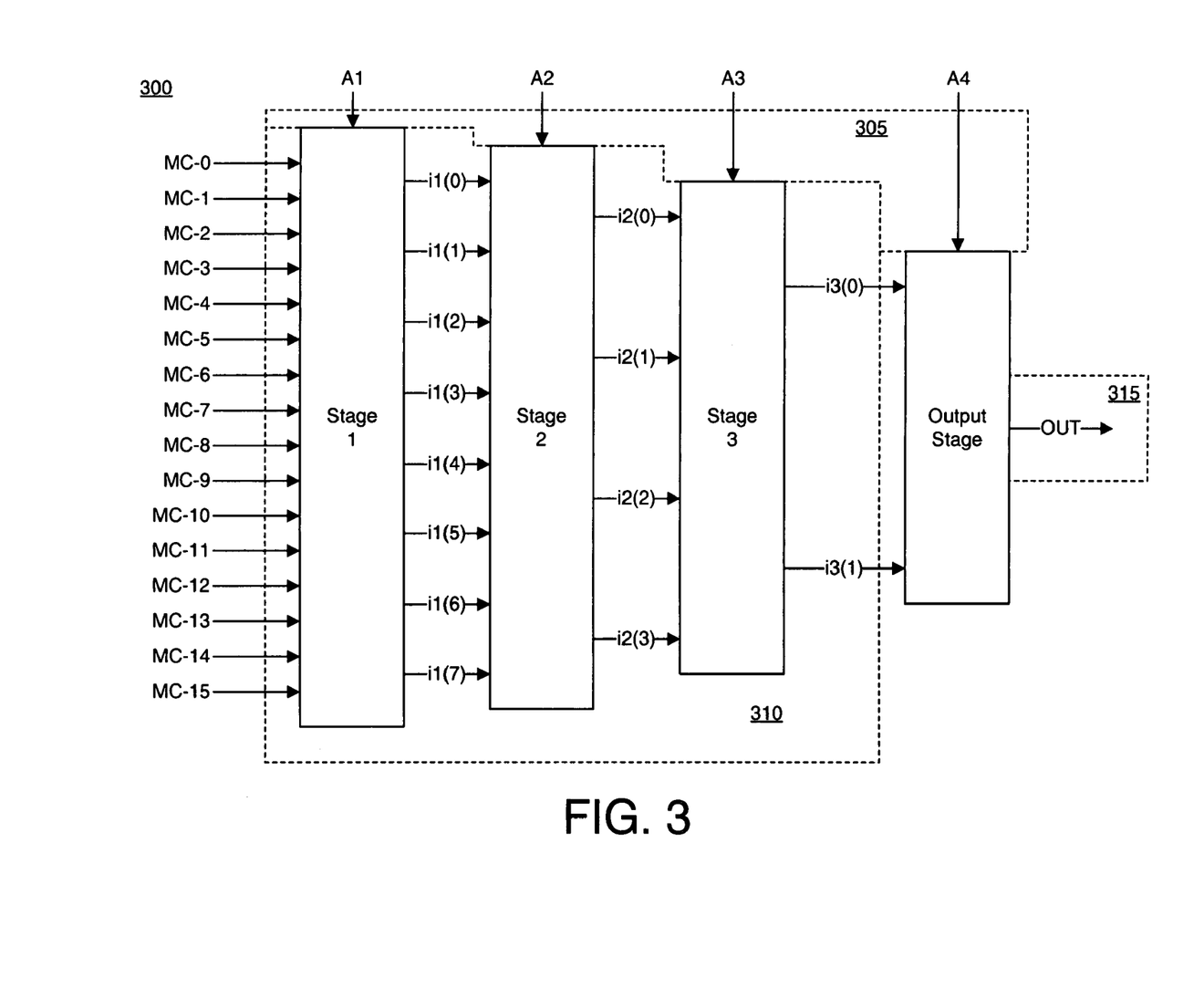
FIG. 3 is a block diagram illustrating a LUT in accordance with one embodiment of the present invention.

FIG. 3 is a block diagram illustrating a simplified view of a LUT 300 in accordance with one embodiment of the present invention. As shown, the LUT 300 can be subdivided into a plurality of different components. In one embodiment, the different components can include an input component 305, an internal component 310, and an output component 315. For each such component, capacitance can be determined as well as a data rate. The data rate refers to the number of times a capacitive node is switched, i.e., charged and discharged, per unit of time, in this case per clock cycle. The data rate also can be referred to as the activity factor, the toggle rate, or the transition density.

Both the capacitance values used and the data rates used reflect the configuration of the LUT 300 as it functions within a given user circuit design. This provides a more accurate estimation of the power consumption of the LUT 300 as opposed to other techniques or models which make assumptions for different values used to compute power without segmenting the LUT into different portions and without regard to the actual configuration of the LUT or its functioning within a user-specified circuit design.

The input component 305 of the LUT 300 includes the input nodes corresponding to input signals A1, A2, A3, and A4 (input nodes A1, A2, A3, and A4). The internal component 310 can include the stages 1, 2, and 3, which also can be referred to as "internal stages". The output stage, in general, can be viewed as the output component 315. The output component 315 can be defined by the output node which provides the signal OUT.

The stages 1, 2, and 3 of the internal component 310 can include internal nodes i1(0)-i1(7), i2(0)-i2(3), and i3(0)-i3(1). The internal nodes i1(0)-i1(7) correspond to stage 1 and input A1. The internal nodes i2(0)-i2(3) correspond to stage 2 and input A2. The internal nodes i3(0)-i3(1) correspond to stage 3 and input A3.

From FIGS. 1-3, it can be seen that the switching rate of the internal nodes of stage 1 depends upon the switching rate of input signal A1 and the function implemented by the LUT 300 as specified by the values stored within MC-0 through MC-15. For example, i1(0) will switch with the input signal A1 when MC-0 and MC-1 are programmed with values of 0 and 1 respectively, i.e., are different. If both memory cells are programmed with the same value, then i1(0) will not switch. With respect to the input node A4, when input signal A4 switches, only the output node switches. The memory cell configuration can be determined from the configuration data specified by the user's circuit design and specifies the function to be implemented or applied given input signals A1-A4.

Figure 4:
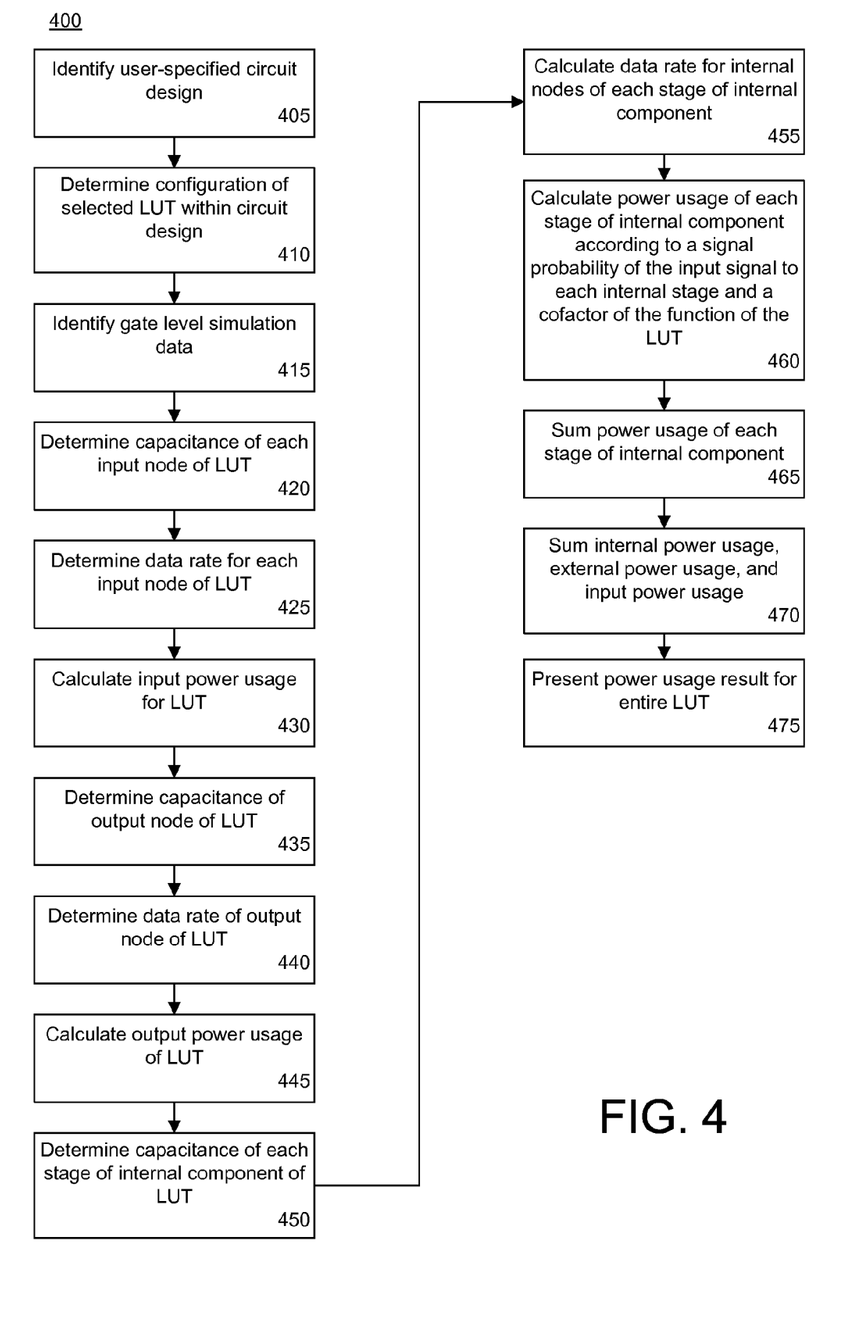
FIG. 4 is a flow chart illustrating a method of calculating power usage of a LUT in accordance with another embodiment of the present invention.

FIG. 4 is a flow chart illustrating a method 400 of estimating power consumption of a LUT in accordance with one embodiment of the present invention. The method 400 can be performed by an EDA tool executing within an information processing system. Accordingly, in step 405, a user-specified circuit design can be identified. By identifying a user-specified circuit design, information relating to the actual power consumption of the LUT within that circuit design can be used in determining power usage, rather than using various averages or assumptions relating to power consumption that are selected without reference to an underlying user-specified circuit design or the particular configuration of the LUT.

In step 410, the configuration for a selected LUT can be determined. With the user-specified design available and identified, the configuration for a particular LUT, a plurality of LUTs, or all LUTs of the circuit design can be determined. The configuration of a LUT can indicate a variety of information including, but not limited to, the number of inputs the LUT will utilize when used within the user-specified circuit design as compared to the number of inputs available on the LUT. Configuration of the LUT further can indicate the particular function that is implemented by the LUT in terms of the output provided by the LUT (the signal OUT) given the inputs A1, A2, A3, A4, etc. For example, configuration information can specify the values stored in MC-0 through MC-15 and, thus, indicate whether the LUT is implementing a logical AND function or an XOR function. It should be appreciated that the type of function that is implemented by the LUT provides additional information with respect to the internal nodes of the LUT in terms of data rate, for example. For example, when an input node is unused, the data rate falls to zero which is reflected in the power calculations.

In step 415, gate level simulation data can be identified for the user-specified circuit design. The gate level simulation data can be written to a text file or other data source and stored within a storage device. The gate level simulation data, as may be determined by an EDA tool, can specify information such as the data rate for each input node and the output node of the LUT. One example of a gate level simulation tool is ModelSIM, available from Mentor Graphics Corporation of Wilsonville, Oreg. A design tool such as XPower, which is available as part of ISE™ Foundation™, from Xilinx, Inc. of San Jose, Calif. can combine data generated by the gate level simulation with capacitance of LUT stages to provide estimated LUT power. The capacitance values for LUT stages, as determined from silicon-based measurements, can be pre-stored within the circuit design tool, e.g., XPower. (Xilinx and ISE are trademarks of Xilinx, Inc. in the United States, other countries, or both).

Beginning in step 420, the power usage of the input component of the LUT can be evaluated. Thus, in step 420, the capacitance of each input node of the LUT can be determined. In one embodiment, such data can be made available from the manufacturer of the integrated circuit upon which the LUT will be implemented, e.g., through an analysis of the silicon data. In that case, the capacitance of the input nodes of the LUT can be stored and provided as part of the EDA tool performing the power analysis of the LUT. The capacitance data, for example, can be read from a table of capacitance data stored within the EDA tool. In step 425, a data rate for each input node to the LUT can be determined. As noted, the data rate for each input node of the LUT can be read from the gate level simulation data for the user-specified circuit design including the configured LUT.

In step 430, the power usage of the input component, i.e., the input power usage, for the LUT can be calculated. In one embodiment, the power for a particular input node can be calculated as $\frac{1}{2}CV^2D$, where C is the capacitance of the input node, D is the data rate of the input node, and V is the voltage of the supply voltage. Thus, for a LUT having input nodes of A1, A2, A3, and A4, the input power can be calculated according to: $\frac{1}{2}C_{A1}V^2D_{A1} + \frac{1}{2}C_{A2}V^2D_{A2} + \frac{1}{2}C_{A3}V^2D_{A3} + \frac{1}{2}C_{A4}V^2D_{A4}$.

The power usage of the output component of the LUT can be evaluated. In step 435, the capacitance of the output node of the LUT can be determined. The output node capacitance can be determined via manufacturer specifications which can be provided with the EDA tool performing the power analysis. In step 440, the data rate of the output node of the LUT can be determined. The data rate of the output node of the LUT can be read from the gate level simulation data of the user-specified circuit design including the configured LUT. In step 445, the power usage of the output component, i.e., the output power usage, of the LUT can be calculated according to $\frac{1}{2}C_{OUT}V^2D_{OUT}$.

Having evaluated the input and output components of the LUT, the internal component can be evaluated. In step 450, the capacitance of each stage of the internal component of the LUT can be determined. In one embodiment, the capacitance of a stage of the LUT can be reflected as the sum of the capacitances of each internal node of that stage. Thus, the capacitance of stage 1 can be determined by summing the capacitance of each internal node of stage 1, e.g., internal nodes i1(0)-i1(7). The capacitance of stage 2 can be determined by summing the capacitance of each internal node of stage 2, e.g., nodes i2(0)-i2(3). The capacitance of stage 3 can be determined by summing the capacitance of each internal node of stage 3, e.g., nodes i3(0)-i3(1).

In one embodiment, this information can be made available by the manufacturer. That is, such information can be determined from an analysis of the physical structures implemented in silicon for the LUT. Accordingly, such data can be programmed or stored as part of the EDA tool.

In another embodiment, the capacitance of each internal node can be determined from the gate level simulation data. By running simulations of the LUT in different operating configurations and observing the power consumption of the LUT during each simulation, the capacitance of each individual node can be determined, particularly given that input power, output power, and the state of the various individual nodes in each simulated configuration are known. In any case, the input node capacitances can be provided, or pre-programmed, as part of a circuit simulation tool.

In step 455, the data rate for the internal nodes of stages 1-3 can be calculated as will be described in further detail herein. In step 460, the power of internal stages 1, 2, and 3 of the LUT can be calculated using the capacitance of each respective stage and the data rate corresponding to each internal node of such stage. As will be described in further detail, the power usage of each stage can be calculated according to a signal probability of the input signal to each internal stage and a cofactor of the function of the LUT. Thus, the internal power of stages 1, 2, and 3 can be expressed as follows:

$$\text{Stage 1} = \tfrac{1}{2} C_{int\_A1} \tfrac{1}{8} V^2 [D(f_{A2A3A4}) + D(f_{A2'A4A4}) + D(f_{A2'A3A4}) + D(f_{A2'A3'A4}) + D(f_{A2A3A4'}) + D(f_{A2'A3A4'}) + D(f_{A2A3'A4'}) + D(f_{A2'A3'A4'})]$$

$$\text{Stage 2} = \tfrac{1}{2} C_{int\_A2} \tfrac{1}{4} V^2 [D(f_{A3A4}) + D(f_{A3'A4}) + D(f_{A3A4'}) + D(f_{A3'A4'})]$$

$$\text{Stage 3} = \tfrac{1}{2} C_{int\_A3} \tfrac{1}{2} V^2 [D(f_{A4}) + D(f_{A4'})]$$

The output stage is incorporated into the LUT power usage determination via the output component.

In step 465, the power usage of the internal component of the LUT, i.e., the internal power, can be determined by summing the power usage of stages 1, 2, and 3. Thus, assuming the power usage of a stage of the LUT is denoted as P(Stage), the power usage of the internal component of the LUT can be calculated as P(Stage 1)+P(Stage 2)+P(Stage 3).

In step 470, the power of the internal component can be summed with the input power usage and the output power usage to obtain an estimate of the power usage for the entire LUT. In step 475, the power usage of the LUT can be presented to a user. The power usage can be presented in graph form or via other graphic means, in numeric form, or the like. The power usage of the LUT can be stored, used, or incorporated in further simulations or functions as may be performed by the simulation tool. Further, the process can be repeated on a per LUT basis to determine the power usage for a plurality of LUTs or all LUTs used by a given user-specified circuit design.

As noted, the power usage of a node, whether an input node, an output node, or an internal node of the LUT, is a function of the capacitance and data rate of that node. While the data rate of the input nodes A1-A4 and output node of the LUT can be obtained directly from the gate level simulation data for the user-specified circuit design, such information is not generated by the gate level simulation for the internal nodes of stages 1, 2, and 3.

Data rate information for the internal nodes of the LUT, however, can be calculated using known probabilistic techniques. Thus, it is informative to consider several probabilistic techniques which are useful for understanding the embodiments disclosed herein. The cofactor of a function $F(x_1, x_2, \ldots x_i, \ldots x_n)$ with respect to variable $x_i$ can be denoted as $fx_i = F(x_1, x_2, \ldots 1, \ldots x_n)$. That is, the cofactor can be the value of the function with the variable $x_i = 1$. The cofactor of $F(x_1, x_2, \ldots x_i, \ldots x_n)$ with respect to variable $x_i'$ can be denoted as $fx_i' = F(x_1, x_2, \ldots 0, \ldots x_n)$, which is the value of the function $F(x_1, x_2, \ldots x_i, \ldots x_n)$ with $x_i = 0$.

The transition density, i.e., the data rate, can be expressed as the number of transitions n that a given signal x makes in a specified time interval T. Thus, the transition density D can be defined as $D(x) = n/T$. The signal probability P(x) at a node x can be defined as the average fraction of a clock cycle in which the steady state value of x is a logic high. The signal probabilities of input nodes A1, A2, A3, and A4 can be generated and stored as part of the gate level simulation data, and thus are available.

The transition density of a function output given the transition density of its inputs can be written as: $D(y) = \sum_{i=1}^{n} P(\partial a / \partial x) * D(x_i)$. Consider the example of an AND gate having two inputs x1 and x2 and an output y. The function of the AND gate can be expressed as $y = x1 x2$. The transition density of the output y expressed in terms of its inputs x1 and x2 can be defined as $D(y) = P(x2)D(x1) + P(x1)D(x2)$. Commercially available, software-based solvers are available, such as DENSIM, which can be used to solve such equations. DENSIM is type of density simulator which is further described in "*Transition Density: A New Measure of Activity in Digital Circuits*", by Farid N. Najm, IEEE Transactions on Computer-Aided Design of Integrated Circuits and Systems, vol. 12, no. 2 (February 1993), which is incorporated herein by reference.

The signal probability of a function output also can be found given the signal probabilities of its inputs. The signal probability of a function output can be expressed as $P(y) = P(x1)P(fx1) + P(x1')P(fx1')$. The probability of the cofactors can be expressed in the same way in terms of their descendents. A depth-first-traversal of the binary decision diagram (BDD), with a post order evaluation of P(x) at every node can be used to solve the equations. In one embodiment, this can be accomplished using the "scan" function of the BDD package of a density simulator such as DENSIM.

Referring again to FIG. 3, it can be seen that stage 1 has 8 internal nodes referenced as i1(0)-i1(7). The switching rate of these internal nodes depends on the switching rate of input node A1, denoted as DAI, and also is a function of the LUT, denoted as F(A1,A2,A3,A4). The power usage of stage 1 can be represented as $\tfrac{1}{2} C_{int\_A1} \tfrac{1}{8} V^2 [D(f_{A2A3A4}) + D(f_{A2'A3A4}) + D(f_{A2A3'A4}) + D(f_{A2'A3'A4}) + D(f_{A2A3A4'}) + D(f_{A2'A3A4'}) + D(f_{A2A3'A4'}) + D(f_{A2'A3'A4'})]$. In this calculation, the total capacitance of stage 1 is denoted as $C_{int\_A1}$ and is calculated as described herein. The internal nodes i1(0)-i1(7) are represented by the terms $(f_{A2A3A4})$, $(f_{A2'A3A4})$, $(f_{A2A3'A4})$, $(f_{A2'A3'A4})$, $(f_{A2A3A4'})$, $(f_{A2'A3A4'})$, $(f_{A2A3'A4'})$, and $(f_{A2'A3'A4'})$ respectively.

The data rate of a given internal node, for example i1(0), can be expressed as $D[i1(0)] = \sum_{i=1}^{n} P[i1(0)] * D(A1)$, where D(A1) corresponds to the data rate of the input node A1, which is known from the gate level simulation data. The probability P[i1(0)] can be expanded as follows: $P[i1(0)] = P(A1)P(fA1) + P(A1')P(fA1')$, where fA1 is the cofactor of F(A1,A2,A3,A4) where A1=1, and fA1' is the cofactor of F(A1,A2,A3,A4) where A1=0. The probability of A1, denoted as P(A1), also is available from the simulation data.

Stage 2 has 4 internal nodes referenced as i2(0)-i2(3). The switching rate of these internal nodes depends upon the data rate of input nodes A1 and A2 ($D_{A1}$ and $D_{A2}$). If the capacitance of stage 2 is denoted as $C_{int\_A2}$, the internal power usage of stage A2 can be represented as $\tfrac{1}{2} C_{int\_A2} \tfrac{1}{4} V^2 [D(f_{A3A4}) + D(f_{A3'A4}) + D(f_{A3A4'}) + D(f_{A3'A4'})]$. In this case, the terms $(f_{A3A4})$, $(f_{A3'A4})$, $(f_{A3A4'})$, and $(f_{A3'A4'})$ correspond to internal nodes i2(0)-i2(3) respectively. The terms can be expanded solved as shown with reference to stage 1 using the transition density equations.

Stage 3 has 2 internal nodes referenced as i3(0)-i3(1). The switching rate of these internal nodes depends upon the data rate of input nodes A1, A2, and A3 ($D_{A1}$, $D_{A2}$, and $D_{A3}$). If the capacitance of stage 3 is denoted as $C_{int\_A3}$, the internal power usage of stage 3 can be represented as $\frac{1}{2}C_{int\_A3}\frac{1}{2}V^2[D(f_{A4}) + D(f_{A4'})]$. In this case, the terms ($f_{A4}$) and ($f_{A4'}$) correspond to internal nodes i3(0)-i3(1) respectively. The terms can be expanded solved as shown with reference to stage 1 using the transition density equations.

The embodiments disclosed herein are directed to determining a measure of power consumption for a LUT as may be incorporated within a PLD. Rather than relying upon general, static, assumptions regarding a LUT, the actual configuration of the LUT and its usage within a user-specified circuit design are taken into account. Further, the LUT is subdivided into a plurality of components which are independently evaluated in terms of power consumption to determine the power usage of the entire LUT.

The embodiments disclosed herein have been described using one particular formula for calculating power usage. It should be appreciated that power usage can be calculated using any of a variety of different expressions that incorporate data rate and capacitance. Further the LUT, as noted, can include fewer or additional internal stages and inputs depending upon the configuration. As such, the embodiments disclosed herein are not intended to be limited by the particular physical configuration of the LUT that is used, e.g., in terms of internal stages or total number of available inputs. Additionally, the particular EDA tools noted herein have been provided for purposes of illustration only and, as such, are not intended to limit the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e. open language. The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of calculating power usage of a lookup table (LUT), wherein the LUT comprises a plurality of internal stages and each internal stage is coupled to an input signal to the LUT, the method comprising:
    determining input power usage of the LUT;
    determining output power usage of the LUT;
    determining internal power usage of the LUT by summing power usage of each output of each internal stage of the LUT and calculating power usage of each output of each internal stage according to a signal probability of the input signal to each internal stage and a cofactor of a function of the LUT, wherein calculating power usage of each output of each internal stage further comprises, for each output of each internal stage of the LUT, summing a first product and a second product, wherein the first product comprises the signal probability of the input signal to the internal stage multiplied by a probability of the cofactor of the function of the LUT wherein the input signal of the internal stage is one, wherein the second product comprises the signal probability of an inverse of the input signal to the internal stage multiplied by a probability of the cofactor of the function of the LUT wherein the input signal of the internal stage is zero; and
    providing a measure of power usage for the entire LUT by summing the input power usage, the output power usage, and the internal power usage.

2. The method of claim 1, wherein determining input power usage further comprises:
    identifying a capacitance for each input node of the LUT;
    identifying a data rate for each input node of the LUT; and
    calculating power usage for each input node of the LUT individually as a function of the data rate and the capacitance for each respective input node.

3. The method of claim 2, wherein identifying a data rate for each input node of the LUT further comprises determining the data rate for each respective input node of the LUT from simulation data generated by a gate level simulation of a user-specified circuit design incorporating the LUT in a selected configuration.

4. The method of claim 3, wherein determining input power further comprises summing the power usage of each input node.

5. The method of claim 1, wherein determining output power usage further comprises:
   identifying a capacitance of an output node of the LUT;
   identifying a data rate of the output node of the LUT; and
   calculating power usage of the output node of the LUT as a function of the capacitance of the output node of the LUT and the data rate of the output node of the LUT.

6. The method of claim 5, wherein identifying a data rate of the output node of the LUT further comprises determining the data rate for the output node of the LUT from simulation data generated from a gate level simulation of a user-specified circuit design incorporating the LUT in a selected configuration.

7. The method of claim 1, wherein calculating power usage for each internal stage of the LUT further comprises:
   identifying a capacitance for each internal stage of the LUT; and
   determining a data rate for each internal node of each internal stage of the LUT, wherein calculating the power consumption for each internal stage depends upon the capacitance and data rate of each internal node for each respective internal stage of the LUT.

8. A computer-implemented method of estimating power usage of a lookup table (LUT), wherein the LUT comprises a plurality of internal stages and each internal stage is coupled to an input signal to the LUT, the method comprising:
   segmenting the LUT into an input component, an internal component, and an output component;
   determining separate measures of power consumption for each component, wherein the measures of power consumption are functions of data rate and capacitance for each respective component of the LUT and the measure of power consumption for the internal component is calculated according to a signal probability of the input signal to each respective internal stage and a probability of a cofactor function of the LUT calculated for each respective internal stage; and
   summing the measures of power for the input component, the internal component, and the output component to determine a measure of power consumption for the entire LUT;
   wherein determining separate measures of power consumption for each component further comprises, for the internal component:
      segmenting the internal component into a plurality of stages;
      determining a measure of power consumption for each stage of the plurality of stages as a function of capacitance for each respective stage and data rate for internal nodes of each respective stage and, for each internal node of each internal stage of the LUT, summing a first product with a second product, wherein the first product comprises the signal probability of the input signal to the internal stage multiplied by a probability of the cofactor of the function of the LUT wherein the input signal of the internal stage is one, wherein the second product comprises the signal probability of an inverse of the input signal to the internal stage multiplied by a probability of a cofactor of the function of the LUT wherein the input signal of the internal stage is zero; and
      summing the measures of power consumption for each stage of the plurality of stages to determine the measure of power consumption for the internal component of the LUT.

9. The method of claim 8, wherein determining separate measures of power consumption for each component further comprises, for the input component:
   segmenting the input component into a plurality of input nodes;
   determining a measure of power consumption for each input node of the plurality of input nodes as a function of capacitance and data rate for each respective input node, wherein the data rate of each respective input node is determined from gate level simulation data of a user-specified circuit design in which the LUT is disposed; and
   summing the measures of power consumption for each input node of the plurality of input nodes to determine the measure of power consumption for the input component of the LUT.

10. The method of claim 8, wherein determining separate measures of power consumption for each component further comprises, for the output component, determining a measure of power consumption for an output node of the LUT as a function of capacitance and data rate of the output node of the LUT, wherein the data rate of the output node is determined from a gate level simulation of a user-specified circuit design in which the LUT is disposed.

11. A machine readable storage, having stored thereon a computer program having a plurality of code sections for calculating power usage of a lookup table (LUT), wherein the LUT comprises a plurality of internal stages and each internal stage is coupled to an input signal to the LUT, the machine readable storage comprising:
   code for determining input power usage for the LUT;
   code for determining output power usage for the LUT;
   code for determining internal power usage for the LUT by summing power usage of each output of each internal stage of the LUT and calculating power usage of each output of each internal stage according to a signal probability of the input signal to the internal stage and a cofactor of a function of the LUT, wherein the code for calculating power usage of each output of each internal stage further comprises, code for, for each output of each internal stage of the LUT, summing a first product with a second product, wherein the first product comprises the signal probability of the input signal to the internal stage multiplied by a cofactor of the function of the LUT wherein the input signal of the internal stage is one, wherein the second product comprises the signal probability of an inverse of the input signal to the internal stage multiplied by a probability of the cofactor of the function of the LUT wherein the input signal of the internal stage is zero; and
   code for providing a measure of power usage for the entire LUT by summing the input power usage, the output power usage, and the internal power usage.

12. The machine readable storage of claim 11, wherein the code for determining input power usage further comprises:
   code for identifying a capacitance for each input node of the LUT;
   code for identifying a data rate for each input node of the LUT; and
   code for calculating power usage for each input node of the LUT individually as a function of the data rate and the capacitance for each respective input node.

13. The machine readable storage of claim 12, wherein the code for identifying a data rate for each input node of the LUT further comprises code for determining the data rate for each respective input node of the LUT from simulation data generated by a gate level simulation of a user-specified circuit design incorporating the LUT in a selected configuration.

14. The machine readable storage of claim 13, wherein the code for determining input power usage further comprises code for summing the power usage of each input node.

15. The machine readable storage of claim 11, wherein the code for determining output power usage for the LUT further comprises:
    code for identifying a capacitance of an output node of the LUT;
    code for identifying a data rate of the output node of the LUT; and
    code for calculating power usage of the output node of the LUT as a function of the capacitance of the output node of the LUT and the data rate of the output node of the LUT.

16. The machine readable storage of claim 15, wherein the code for identifying a data rate of the output node of the LUT further comprises code for determining the data rate for the output node of the LUT from simulation data generated from a gate level simulation of a user-specified circuit design incorporating the LUT in a selected configuration.

17. The machine readable storage of claim 11, wherein the code for calculating power usage for each internal stage of the LUT further comprises:
    code for identifying a capacitance for each internal stage of the LUT; and
    code for determining a data rate for each internal node of each internal stage of the LUT, wherein the code for calculating the power usage for each internal stage depends upon the capacitance and the data rate of each internal node for each respective internal stage of the LUT.

* * * * *